Jan. 24, 1961   J. E. AINSWORTH, JR   2,968,947
PRESSURE MEASURING DEVICE
Filed April 23, 1957   2 Sheets-Sheet 1
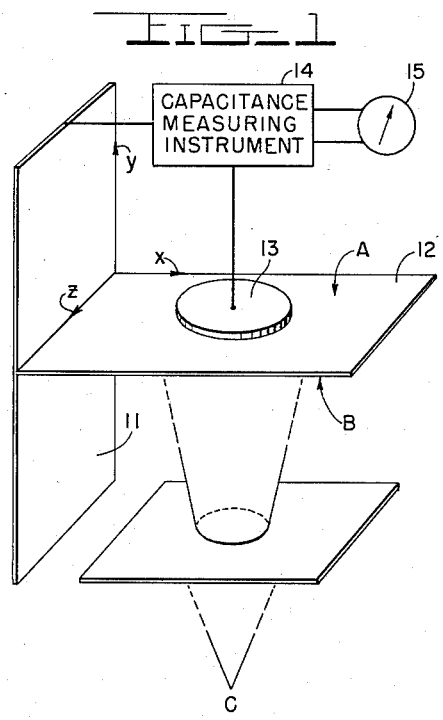
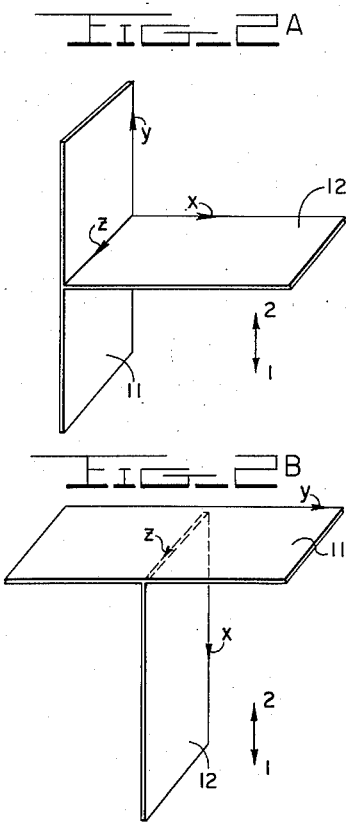
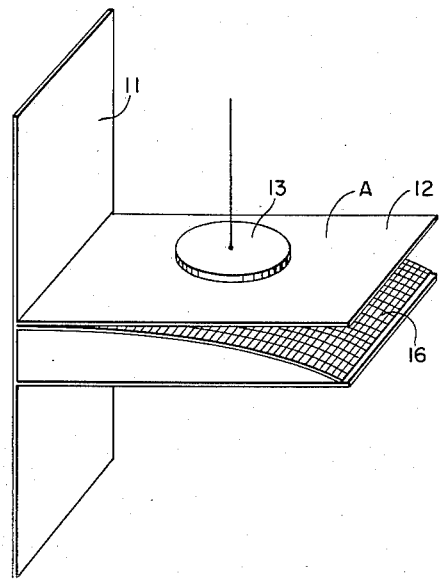
FORCE DIRECTIONS
INVENTOR
JOHN E. AINSWORTH, JR.
ATTORNEYS Jan. 24, 1961 J. E. AINSWORTH, JR 2,968,947
PRESSURE MEASURING DEVICE
Filed April 23, 1957 2 Sheets-Sheet 2
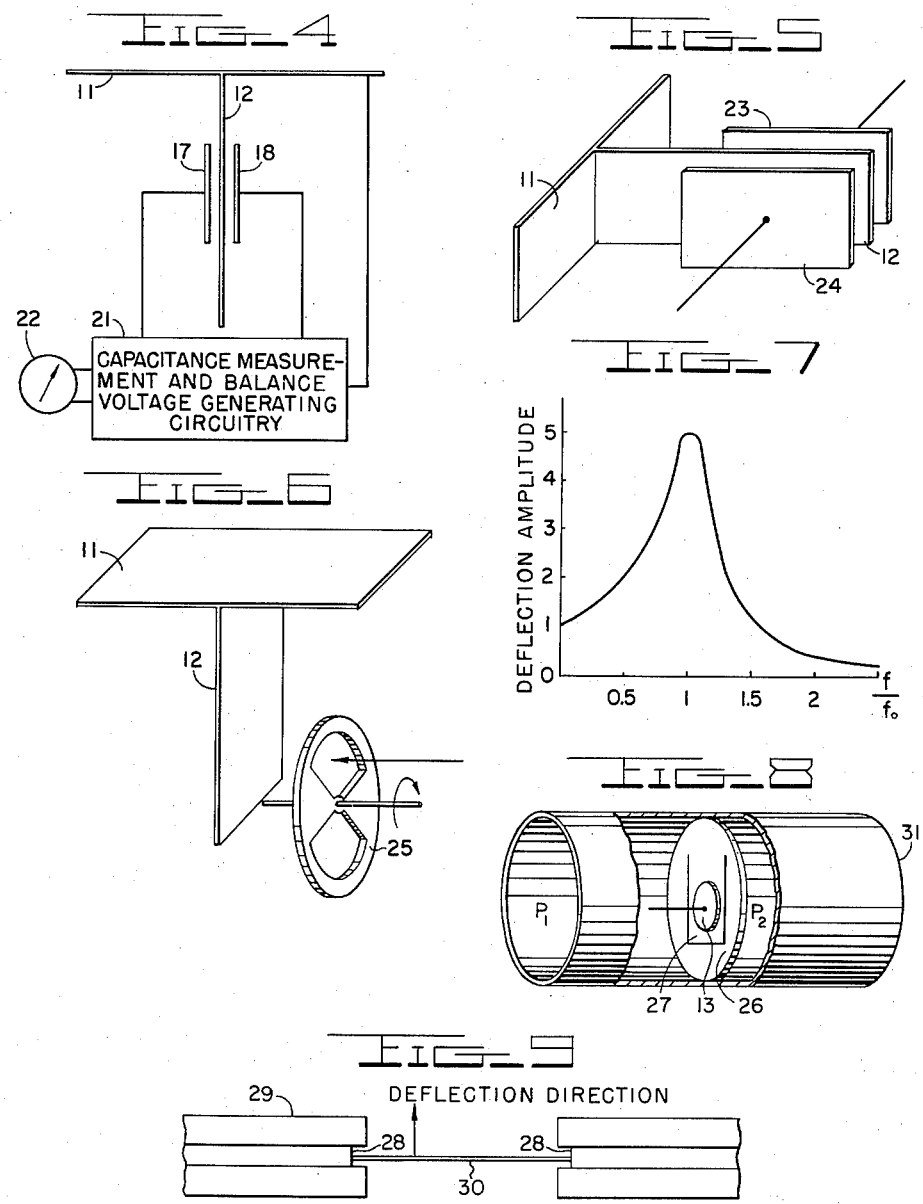
INVENTOR
JOHN E. AINSWORTH, JR.
BY
ATTORNEYS

United States Patent Office 2,968,947
Patented Jan. 24, 1961

2,968,947

PRESSURE MEASURING DEVICE

John E. Ainsworth, Jr., 5014 25th Place N., Arlington, Va.

Filed Apr. 23, 1957, Ser. No. 654,628

1 Claim. (Cl. 73—398)

(Granted under Title 35, U.S. Code (1952), sec. 266)

The invention described herein may be manufactured and used by or for the Government of the United States of America for governmental purposes without the payment of any royalties thereon or therefor.

The present invention relates to low pressure measuring instruments and more particularly to low pressure measuring instruments employing a thin strip cantilever.

Heretofore, mechanical methods for measuring small pressures have been used such as (1) viscosity pressure gauges (2) corrugated diaphragm, stretched diaphragm, and clamped diaphragm gauges and (3) Knudsen type pressure gauges and (4) non-mechanical gauges. These gauges have serious limitations; for example, viscosity and Knudsen gauges do not combine high sensitivity accuracy and ruggedness; they are difficult to calibrate accurately, and they are damaged by violent motion. The diaphragm pressure type lacks the sensitivity required for convenient low pressure measurement and is particularly sensitive to temperature changes and temperature transients.

Among the non-mechanical gauges, ionization gauges are capable of measuring a very wide range of pressures, but require considerable auxiliary electrical equipment; their sensitivity varies for different gases and vapors; their filaments may be poisoned in the presence of certain gases and the hot filament decomposes certain gases.

The device of the present invention has high sensitivity, it is very accurate at very low pressures, it is not sensitive to temperature changes and temperature transients and overcomes many other disadvantages of the prior art.

An object of the present invention is to provide low pressure measuring instruments which are not damaged by violent motions and yet have good sensitivity.

Another object is to provide low pressure measuring instruments which do not require a force field for operation and which are easily and accurately calibrated at extremely low pressure.

Still another object is to provide a low pressure gauge which is not easily affected by temperature changes and temperature transients.

Other and more specific objects of this invention will become apparent upon a more careful consideration of the following detailed description when taken together with the accompanying drawings, in which:

Fig. 1 illustrates a diagrammatic view of a thin strip cantilever and an associated electrical indicating means;

Figs. 2A, 2B, and 2C illustrate three possible orientations of a cantilever with respect to the direction of gravitational or inertial forces in a force field;

Fig. 3 illustrates a thin strip cantilever similar to Fig. 1 which further includes an overpressure protection means;

Fig. 4 illustrates an electrostatic null-balance arrangement;

Fig. 5 illustrates a cantilever gauge which makes use of the Knudsen principle;

Fig. 6 illustrates the use of means for modulating the pressure acting on the cantilever;

Fig. 7 illustrates a typical cantilever deflection amplitude vs. frequency curve;

Fig. 8 illustrates the use of a cantilever to measure differential and absolute pressures; and Fig. 9 illustrates the use of laminates to reduce the fluid flow rate in the cantilever gauge illustrated in Fig. 8.

In accordance with the teaching of the present invention, the means for measuring low pressures makes use of a thin strip cantilever upon which the pressure to be measured acts. The cantilever is associated with adjacent surfaces and the relationship between the cantilever and the adjacent surfaces is determined by the pressure acting on the cantilever. The pressure acting on the cantilever is then measured by appropriate means according to the relationship of the surfaces.

Referring now to the drawings wherein like reference characters represent like parts throughout the various figures, there is shown in Fig. 1 a typical cantilever gauge according to this invention. The gauge comprises a support 11 from which is supported a cantilever 12 which forms a movable surface of a capacitor. Adjacent the cantilever arm, a stationary surface 13 is placed to form another surface of the capacitor and is held in position by any suitable means which is not shown for simplification of the drawings.

The deflection of the cantilever 12 is a measure of the sum of all pressures in the Y direction due to any given matter or energy distributions which are incident upon one or both of the principal surfaces A, B of the cantilever. The cantilever in Fig. 1 being shown with a uniform pressure distribution on surface A and a pressure distribution of surface B from a non-directional source C. The cantilever is made of metal, or of a non-metallic material, fully, or partially covered with a conducting film, and the deflection is measured by measuring the change in capacitance between the cantilever 12 and the surface 13. Surface 13 is shown as a disc, but other capacitance measuring configurations may be used. Any suitable measuring means may be used; for example, a capacitance measurement instrument 14 which presents the value of the capacitance on sensitive meter 15. An increase in sensitivity may be obtained by the use of an additional capacitance surface positioned on the opposite side of cantilever 12 and connected into the electrical circuit.

In some instances, the sensitivity of the cantilever will be such that voltages applied to the fixed capacitor plates during capacitance measurement, will create an electrostatic force sufficient to deflect the cantilever or to cause it to stick to a capacitor surface. This effect can be reduced by low duty cycle modulation of the applied voltage. By this method the capacitance is in effect measured during time intervals sufficiently short to prevent the accompanying electrostatic force from obtaining an appreciable deflection of the centilever.

The characteristics of cantilevers as used in the present invention can best be described by an examination of certain equations and force field orientations wherein like letters represent like components throughout all equations.

(1) The deflection at the free end of a thin strip cantilever, uniformly loaded or on side is given by:

$$y = \frac{0.0288 q L^4 \left(1 - \frac{1}{m^2}\right)}{E h^3}$$

where $q$ is the pressure in mm. Hg; $L$ is the cantilever length; $1/m$ is Poisson's ratio; $E$ is Young's modulus and $h$ is the cantilever thickness. Deflection is essentially independent of cantilever width ($z$—direction distance of Fig. 1).

(2) The approximate ratio of the elastic restoring force per $g$ (gravitational acceleration) directed along the $x$-axis is:

$$R = \frac{0.668Eh^2}{dL^3(1-1/\text{m.}^2) \cdot a}$$

where $a$ is the number of $g$ units of acceleration.

(3) The deflection per $g$ for inertial forces directed along the $y$-axis is:

$$y = \frac{1.5dL^4(1-1/\text{m.}^2) \cdot a}{Eh^2}$$

(4) The maximum deflection at the free end for a cantilever uniformly loaded on one side to its elastic limit is:

$$y = \frac{P_{max}(1-1/\text{m.}^2)L^2}{2hE}$$

where $P_{max}$ is the maximum stress in p.s.i. at the elastic limit.

(5) The sensitivity of the cantilever per $g$, for inertial force directed along the $y$-axis is:

$$P_{\text{mm. Hg}} = 51.9 dha$$

(6) The deflection of a cantilever loaded at the free end with a weight $w$ (pounds):

$$y = \frac{4wL^3}{Eh^3(1-1/\text{m.}^2)}$$

(7) The electrostatic force per unit area acting on each of two equal plates spaced $t$ inches apart in an air dielectric:

$$\frac{F_{\text{mm. Hg}}}{A} = 5.14(10)^{-11} \frac{V^2}{t^2}$$

where $A$ is the area of one plate in square inches.

(8) The lowest natural resonant frequency of a cantilever is:

$$f = \frac{3.19E^{1/2}h}{d^{1/2}L^2}$$

The three principal orientations of a cantilever with respect to the direction of gravitational or inertial forces are illustrated in Figs. 2(A), (B) and (C).

Three particular cantilevers will be described which will illustrate the application of the preceding discussion and will present the characteristics of representative cantilevers.

A nickel cantilever, 1" long and 0.01" thick, will be deflected about 0.001" by a uniform pressure of 1 mm. Hg acting on one side of the cantilever. Its resonant frequency is about 320 cycles per second; its force ratio is about 6900; its $g$ sensitivity is about $170(10)^{-3}$ mm. Hg/$g$ and its elastic limit deflection is about 0.028". This cantilever can be used in all orientations shown in Figs. 2A, 2B and 2C. The force ratio is sufficiently large that for constant accelerations up to 50 $g$ the principal restoring force is elastic (within 1%), the elastic limit is not exceeded, and constant acceleration affects the zero position of the cantilever. Zero position shift is largest in orientation ($a$) and considerably smaller in orientations ($b$) and ($c$). The zero shift obtained in orientation ($a$) affords a simple method for obtaining the pressure sensitivity of the cantilever. Deflections corresponding to 1, $10^{-1}$ and $10^{-2}$ mm. Hg can be obtained by accelerations of about 6.65, 0.665 and 0.0665 $g$. Experimentally, the first acceleration can be obtained using an accelerator and the latter two are obtained by proper orientation in the earth's field.

A nickel cantilever, 1" long and 0.001" thick, will be deflected 0.001" by a uniform pressure of $10^{-3}$ mm. Hg acting on one side of the cantilever. Its resonant frequency is about 32 cycles per second; its force ratio is about 69; its $g$ sensitivity is about $17(10)^{-3}$ mm. Hg/$g$ and its elastic limit deflection is about 0.3". This cantilever can be used in all orientations shown in Figs. 2A, 2B and 2C for 1% measurements as long as the constant acceleration is less than 0.7 $g$; the elastic limit, however, is not reached except for accelerations greater than 18 $g$. The zero position shift due to constant force is largest in orientation ($a$) and considerably less in orientations ($b$) and ($c$). Zero shift in orientation ($a$) provides a method for obtaining the pressure sensitivity of the cantilever. Deflections corresponding to $10^{-1}$, $10^{-2}$ and $10^{-3}$ mm. Hg can be obtained for accelerations of 7, 0.7 and 0.07 $g$. Any required acceleration value of 1 $g$, or less, can be accurately obtained by proper orientation in the earth's gravitational field. The cantilever can be calibrated electrostatically. A suitable structure, for example, a fine mesh can be placed parallel to the $x$—$z$ plane at a distance of 0.01" from the cantilever, and covering an entire principal plane. Plate voltages of 31.6, 10, and 2.16 volts will correspond to pressures of about $5 \times 10^{-4}$, $5 \times 10^{-5}$ and $5 \times 10^{-6}$ mm. Hg.

A nickel cantilever, 1" long and 0.0001" thick, will be deflected about 0.001" by a uniform pressure of $10^{-6}$ mm. Hg acting on one side of the cantilever. Its resonant frequency is about 3 cycles per second; its force ratio is about 0.07; its $g$ sensitivity is about $1.7(10)^{-3}$ mm. Hg/$g$, and its elastic limit deflection is greater than 1". This cantilever cannot be operated in orientation ($a$) except under very small acceleration, and it must be protected whenever orientation ($a$) is assumed in the presence of large accelerations. In orientation ($b$) where the force is in the direction of 1, Fig. 2(B), and under accelerations of 1 $g$ the elastic restoring force is roughly equal to 0.7 of the inertial restoring force, and the calibration is dependent upon knowledge of the acceleration. The orientation where the force is in the direction of 2, Fig. 2(B), is unstable when the inertial force is greater than the elastic force, and buckling will result for this condition. In orientation ($c$) the effect of force is diminished, and for an orientation accuracy of 1° and accelerations up to 1 $g$, inertial force contributes less than 2½% to the total restoring force. Zero position shift under these conditions is 0.3". Orientation ($c$) is subject to buckling but this can be remedied to some extent by increasing the width of the cantilever. Electrostatic calibration can be obtained by placing a plate or fine mesh parallel to the $x$—$z$ plane at a distance of 0.05" from the cantilever and covering an entire principal plane. In orientation ($c$), plate voltages of 10, 3.16, 1, and 0.32 volts will yield deflections corresponding to about $2.1(10)^{-6}$, $2.1(10)^{-7}$, $2.1(10)^{-8}$ and $2.1(10)^{-9}$ mm. Hg.

The thin strip cantilever must be protected against any inertial, gravitational, radiation, and matter pressures which will distort the cantilever into curvature greater than that permitted by the elastic limit of the material. Fig. 3 illustrates a method for using a wire mesh 16 for protection of the cantilever against large pressures on the A plane. Various other forms of constraint may be used as the occasion requires. The protecting constraints can also be wholly or partially obtained from deflection measurement capacitance surfaces, from the electrostatic calibration surfaces, from the electrostatic null balancing surfaces which will be subsequently described, or from the housing of the cantilever as will be described in more detail for certain differential pressure gauges.

In order to prevent large cantilever deflection, or to avoid the various elastic defects to which all materials are subject, the principle of electrostatic null balancing as illustrated by Fig. 4 can be used. In this application, a very small initial deflection of the cantilever is detected and an electrostatic force is applied to the cantilever to the extent required to prevent any further deflection of the cantilever. The large deflections which encounter elastic defects are thus avoided and a measurement of the balancing electrostatic force is sufficient to determine the sum of the pressures on the cantilever which would deflect it from the null position. For example, in Fig. 4 the cantilever deflection is measured using surfaces 17 and 18 as part of a resonant bridge circuit of any well known type illustrated in block form 21. The deflection of the cantilever causes an unbalance of the bridge which in turn applies a D.C. voltage to 17 and 18 of such polarity as to restore the cantilever to within a small distance of its zero position. A measurement of this D.C. voltage indicated by gauge 22 is sufficient to determine the sum of the pressures acting on the cantilever.

Measurement of small pressures can also be accomplished by use of the Knudsen effect. In Fig. 5 the cantilever 12 is placed in a container wherein the gas pressure is to be measured. Opposite one surface of the cantilever is placed a heated element at a distance less than the mean free path of the gas to be measured. The heated element 23 is maintained at a higher temperature than the cantilever 12 and can also act as a surface of the deflection measurement capacitance. The gas molecules between the cantilever and the heated element, strike, and are heated by this element, and subsequently move at higher velocity than the ambient molecules. The high velocity molecules strike the surface of the cantilever causing the cantilever to move away from the heated element. The distance moved, changes the deflection measurement capacitance which is indicated by the meter and the change in capacitance can be related to the ambient pressure.

Greater sensitivity can be obtained by placing a second element 24 on the opposite side of the cantilever wherein the temperature of the second element is sufficiently less than that of the cantilever. Gas molecules between the cantilever and the cold element, strike, and are cooled by this element, and subsequently move at lower velocity than the ambient molecules. These slow velocity molecules, in striking the cantilever, present a reduced pressure, and thus allow additional cantilever deflection.

In certain applications of the cantilever, the zero shift due to acceleration is large compared to the pressure deflection and hinders accurate measurement. Under these circumstances, the pressure on the cantilever may be modulated as shown by illustration in Fig. 6 wherein a mechanical sector 25 is used to modulate the pressure presented by a pencil-beam pressure source. In other cases the applied pressure may be modulated electrically or optically, but in all cases the cantilever deflection measurement equipment is designed to reject cantilever zero position information and to develop an output proportional to the peak to peak amplitude of the modulation of the applied pressure. An improvement in the ultimate sensitivity of a cantilever can be obtained by modulating the pressure at the resonant frequency of the cantilever. Fig. 7 shows the amplitude of the cantilever deflection for a pressure modulation of constant amplitude, but of varying frequency. In most cases the deflection amplitude at resonance is limited by internal losses.

In Fig. 8 a cantilever is used as a differential pressure gauge positioned in the path of a gas flow and is set in a partition 26 separating a chamber at pressure $P_1$ from a chamber at pressure $P_2$, $P_1$ greater than $P_2$. The cantilever consists of a thin strip of metal 27 clamped to the partition or formed as an integral part of the partition. The open area between the cantilever and its partition is small, and the distance between the cantilever and its partition is small compared to the mean free path of the gas. As an example of constructing the cantilever as an integral part of the partition the cantilever is etched from the partition using a photo-engraving process which effects a separation of 0.0005". The total open area surrounding the cantilever is $$(1''+1''+0.3'') \times (0.0005'') = 1.15(10)^{-3} \text{ in.}^2$$

For all values of $P_1$ and $P_2$ less than $10^{-2}$ mm. Hg, the mean free path is greater than 6 mm. and the total flow of gas through the partition is approximately 0.08 liter/sec. at pressure $P_1$. The gauge is therefore useful under those dynamic conditions where no appreciable reduction in $P_1$ or increase in $P_2$ is obtained by a flow of 0.08 liter/sec. through the cantilever spacing. For those applications in which still a greater reduction in flow is required, special housings may be used. A cross section of such a structure being illustrated in Fig. 9 which makes use of laminates 28 in the partition 29 to reduce flow rate by cantilever 30.

A differential pressure cantilever as described above may also be used to measure absolute pressure. As shown in Fig. 8, the chamber is closed on end 31 and a pumping mechanism sufficient to obtain a large pressure ratio $P_1/P_2$ is connected thereto. For a pressure ratio of 20, one measures the absolute value of pressure $P_1$ within 5% of the actual value. The pumping device may consist of a mechanical pump, an oil or mercury diffusion pump, an electrical ion and/or chemical pump or an evapor-ion type pump. For a leak rate of 0.08 liter/sec., a full scale pressure of $5(10)^{-5}$ mm. Hg may be read to 5%, provided the backing pump has a capacity of 8 liters/sec. at $2.5(10)^{-6}$ mm. Hg.

In the more sensitive applications the cantilever must be shielded from stray electrostatic and radiation pressures.

Obviously many modifications and variations of the present invention are possible in the light of the above teaching. It is therefore to be understood, that within the scope of the appended claim, the invention may be practiced otherwise than as specifically described.

What is claimed is:

A pressure measuring device comprising a thin strip cantilever secured in an opening in a partition separating two adjacent areas having different pressures, said cantilever forming a movable surface of a capacitor and having a small spacing between the out edges of said cantilever and the adjacent partition wall surfaces, a stationary capacitor plate secured adjacent to said cantilever, means for measuring the capacitance change due to a deflection of said cantilever in accordance with the sum of the pressures acting on said cantilever.

References Cited in the file of this patent

UNITED STATES PATENTS

| | | |
|---|---|---|
| 1,346,427 | Shrader | July 13, 1920 |
| 1,916,076 | Rupp | June 27, 1933 |
| 2,531,417 | Fischer | Nov. 28, 1950 |
| 2,567,253 | Strange et al. | Sept. 11, 1951 |
| 2,575,492 | Dittmann | Nov. 20, 1951 |
| 2,655,044 | Dumond | July 13, 1953 |
| 2,738,676 | Worden et al. | Mar. 20, 1956 |

FOREIGN PATENTS

| | | |
|---|---|---|
| 426,957 | Germany | Sept. 14, 1924 |
| 630,885 | Great Britain | Oct. 24, 1949 |

OTHER REFERENCES

Comptes Rendus, vol. 190, papers 733, 734 and 735, March 1930.